United States Patent [19]

Matzke et al.

[11] Patent Number: 4,789,691

[45] Date of Patent: Dec. 6, 1988

[54] ELASTOMERS CONTAINING POLYAMIDE GROUPS AND POLYUREA GROUPS IN BONDED FORM, AS WELL AS A PROCESS FOR THE PREPARATION OF ELASTIC, NON-CELLULLAR MOLDED ARTICLES FROM THESE ELASTOMERS

[75] Inventors: Guenter Matzke; Peter Horn, both of Heidelberg; Hans U. Schmidt, Ludwigshafen, all of Fed. Rep. of Germany

[73] Assignee: BASF Aktiengesellschaft, Ludwigshafen, Fed. Rep. of Germany

[21] Appl. No.: 168,422

[22] Filed: Mar. 15, 1988

[30] Foreign Application Priority Data

Mar. 28, 1987 [DE] Fed. Rep. of Germany ....... 3710432

[51] Int. Cl.$^4$ .............................................. C08G 18/14
[52] U.S. Cl. ................................... 521/159; 521/163;
528/44; 528/60; 528/64; 528/67; 528/76;
564/248; 564/278
[58] Field of Search .................. 521/159, 163; 528/44,
528/60, 64, 67, 76; 564/248, 278

[56] References Cited

U.S. PATENT DOCUMENTS 3,682,867 8/1972 Shackelford .......................... 528/44

Primary Examiner—Maurice J. Welsh
Attorney, Agent, or Firm—William G. Conger; Norbert M. Lisicki

[57] ABSTRACT

The subject of this invention is elastomers containing polyamide groups and polyurea groups in bonded form, which are prepared by the reaction of (a) at least one organic polyisocyanate and/or a modified polyisocyanate mixture having an NCO content of from 8 to 33.6 weight percent,
(b) at least one polyazomethine and
(c) at least one alkyl-substituted aromatic polyamine having a molecular weight up to 500, in the presence of or in the absence of
(d) catalysts, whereby reaction products of polyoxyalkylenepolyamines, having a functionality of from 2 to 4 and an average molecular weight of from 180 to 10,000 and at least one organic aldehyde and/or preferably ketone, are used as the polyazomethines.

22 Claims, No Drawings

ELASTOMERS CONTAINING POLYAMIDE GROUPS AND POLYUREA GROUPS IN BONDED FORM, AS WELL AS A PROCESS FOR THE PREPARATION OF ELASTIC, NON-CELLULLAR MOLDED ARTICLES FROM THESE ELASTOMERS

The preparation of polyamide-elastomers, polyurethane-elastomers, polyurethane-polyurea-elastomers, polyurethane-elastomers and polyamide-polyurea-elastomers and a process for the preparation of non-cellular or cellular molded articles from such elastomers with the help of RIM technology are all well known from numerous literature publications and patents.

The preparation of polyamide molded articles by activated alkaline lactam polymerization is, for example, described in the *Plastics Handbook* Vol. VI Polyamides, Carl Hanser Verlag, Munich, 1966, pgs. 46–49. Low-shrinkage polyamide molded articles may also be prepared following the specifications of EP-A-No. 00 99 058 (U.S. patent application Ser. No.4,590,242), by the activated alkaline lactam polymerization using a reaction injection molding technology while adding a selected polymer. These processes are both labor intensive and costly, since the lactam melt containing the catalyst and the lactam melt containing the activating agent are thoroughly mixed together preferably at temperatures in excess of 100° C., then put into the mold where they must be polymerized at temperatures between 130° C. and 200° C.

This disadvantage may be overcome with the help of the isocyanate addition polymerization process, especially using RIM technology, whereby the starting components are routinely mixed together at room temperature and then reacted in molds heated to from 40° C. to 60° C.

A process for the preparation of optionally cellular, elastic molded articles having a closed skin from polyurethane-polyurea elastomers using the principle of reaction injection molding technology (RIM) is described in DE-B No. 26 22 951 (U.S. Pat. No. 4,218,543). The systems cited herein primarily consist of organic polyisocyanates, polyols, reactive aromatic diamines and/or polyamines, which are substituted by alkyl groups in the ortho-position relative to the amino groups, and which contain strong catalysts for the reaction between the hydroxyl and isocyanate groups. Here it is essential to the invention that the aromatic diamines and/or polyamines are miscible in all proportions with polyols having molecular weights from 1200 to 1800, and that the alkyl substituents must have from 1 to 3 carbon atoms, whereby at least two of the alkyl substituents have from 2 to 3 carbon atoms and whereby each of the ortho-positions, relative to the amino groups, is substituted. Such systems possess cream times down to less than one second; the transition from liquid to solid phase takes place almost instantaneously, which causes the liquid reaction mixture to solidify uniformly on the walls of the molds.

It is also known that the reactivity of aromatically bonded amino groups relative to isocyanates can be sharply reduced by electron withdrawing substituents. Examples of such aromatic diamines are cited in DE-C No. 12 16 538 (GB-PS No. 981 935); 3,3'-dichloro-4,4'-diaminodiphenylmethane, 3,3'-dinitro-4,4'-diaminodiphenylmethane and 3,3'-dichloro 4,4'-diaminodiphenyl. The use of such compounds is subject to expensive and inhibitory requirements based on safety regulations. The use of the highly electronegative substituents of these compounds, however, reduces the reactivity of the aromatically bonded amino groups to such a large extent that the curing of the reaction injection molded articles can require up to 15 minutes, thereby making the use of this process uneconomical.

Polyurethane-polyurea formulations having a somewhat reduced reactivity, in comparison to systems cited in DE-B No. 26 22 951, may be prepared according to the specification of EP-A No. 026 915, when 3,3',5,5'-tetra alkyl substituted 4,4'-diaminodiphenylmethanes are used as aromatic diamines, in which the alkyl radicals are different or are the same and represent a methyl radical, ethyl radical, isopropyl radical, sec.- or tert.-butyl radical whereby at least one of the substituents must be an isopropyl radical or sec.-butyl radical. The disclosed tetra-alkyl substituted diaminodiphenylmethanes mix quite well with the polyols in the required amounts at room temperature, and they exhibit only slight or even no tendency toward crystallization, so that the formulatoons are easily handled under the standard conditions for conventional RIM systems. However, it has also been found that the described tetraalkyl-substituted 4,4'-diaminodiphenylmethanes may not be reactive enough for special applications.

Compared to EP-A No. 026 915, somewhat more reactive polyurethane-polyurea formulations are described in EP-A No. 069 286. Trialkyl-substituted metaphenylene diamines are used as the aromatic diamines, whereby two of the alkyl substituents are the same or are different, and are linear or branched alkyl radicals having from 1 to 4 carbon atoms, and the third alkyl radical has from 4 to 12 carbon atoms, or is a 5 or 6 membered cycloalkyl radical. Even with a relatively high diamine content, the formulations exhibit sufficient flowability and produce molded articles which have high temperatures of deflection under a load at elevated temperatures and which do not exhibit a progressive drop in their sheer modulus curves between 100° C. and 200° C.

These processes all have a disadvantage in that there is a considerable reactivity difference of the isocyanate groups with the higher molecular compounds having at least two primary hydroxyl groups and the aromatic diamines, in spite of steric hinderance of the amino groups. This disadvantage may be overcome by using synergistic catalyst combinations of tertiary amines and metal salts, for example, dibutyltin dilaurate, which accelerate the hydroxyl isocyanate addition polymerization reaction. However, polyurethane-polyurea elastomers prepared using metal salt catalysts depolymerize at temperatures of above 150° C., whereby a longer persistent high temperature effect can lead to the complete destruction of the mechanical properties of the material.

Also known is the partial or exclusive use of polyoxyalkylpolyamines having molecular weights of from 1100 to 16,000 in the preparation of elastic polyurethanepolyurea elastomers or polyurea elastomers; for example as disclosed in EP-A-Nos. 033 498, 81 701, 93 861, 92 672, 93 862 and 93 334 and 93 336.

Citing specification EP-A-No. 81 701, for example, higher molecular weight polyoxyalkylenepolyamines having amino groups in bonded form on the aliphatic or aromatic radical may be employed. However, aliphatic polyoxyalkylenepolyamines are generally extremely reactive, so that processing RIM formulations based on these can lead to considerable problems; for example, due to the short shot times and in turn due to the limited material output, there can also be mechanical problems and problems can especially result when finishing voluminous molded articles. The polyoxyalkylenepolyamines having aromatically bonded amino groups react somewhat slower than the aliphatic polyoxyalkylenepolyamines. A disadvantage of these compounds is their expensive preparation in multi-step processes as well as especially their relatively high viscosity, for example more than 20,000 mPas at 25° C., which can generate great difficulties when processing formulations containing a reinforcing agent.

Moreover, U.S. Pat. No. 4,552,945 discloses the preparation of polyamidepolyurea elastomers according to a RIM process, through the reaction of organic polyisocyanates, higher molecular weight compounds, having at least two reactive hydrogen atoms and a combination of chain extending agents, which contains a special enamine, an aromatic diamine and optionally a diol. Such formulations possess a slower gel time and allow one to fill larger molds.

U.S. Pat. Nos. 4,048,105, 4,102,833 and 4,374,210 disclose using prepolymers containing isocyanate groups and quasi-prepolymeres having NCO contents between 9 and 31 weight percent in polyurethane systems, which were prepared while using an optionally modified 4,4'-diphenylmethanediisocyanate.

By selecting suitable higher molecular weight compounds having at least two reactive hydrogen atoms, like for example, polyetherpolyols and/or polyester polyols, polyoxyalkylenepolyamines having primary amino groups in bonded form on the aliphatic or aromatic radical or particularly the corresponding substituted aromatic primary diamines used as chain extending agents, as well as special catalysts or catalyst systems, one can attempt to adapt the RIM formulations to specific requirements, like, for example, the volume and geometry of the mold. However, a disadvantage in this method is that by using the starting compounds, not only the reactivity of the RIM formulations are influenced, but also influenced are the mechanical properties of the resulting molded articles. In turn, molded articles having certain dimensions and larger measurements are only partially able to be prepared or only able to be prepared having decreased mechanical properties since the reaction mixtures cannot flow sufficiently or cannot be introduced into the mold in the required quantities.

The object of the present discovery herein was to improve the flowability of RIM formulations, without impairing the mechanical properties of the resulting molded articles. Adequate green strength in the molded articles prepared has significance in achieving shorter demold times, for example of from 3 to 60 seconds. Furthermore, the elastomers should be able to be exposed, without damage, to a one hour temperature treatment at 200° C., so that the molded articles are able to undergo on-line painting.

This object was surprisingly able to be met by novel elastomers containing in bonded form polyamide groups and polyurea groups, as well as by using modified urethane group-containing polyisocyanates, and optionally elastomers containing polyurethane groups in bonded form.

The subject of the invention are accordingly elastomers containing polyamide groups and polyurea groups in bonded form, which are prepared by the reaction of (a) at least one organic, preferably an aromatic, polyisocyanate and/or a modified polyisocyanate mixture having an NCO content of from 8 to 33.6 weight percent, based on the weight of the polyisocyanate mixture, with
(b) at least one polyazomethine and
(c) at least one alkyl-substituted aromatic polyamine having a molecular weight up to about 500 in the presence of or in the absence of (d) catalysts, and wherein reaction products from polyoxyalkylenepolyamines, having a functionality of from 2 to 4 and having an average molecular weight of from 180 to 10,000, and at least one organic aldehyde and/or preferably an organic ketone, are used as the polyazomethines (b).

The said elastomers containing polyamide groups and polyurea groups in bonded form, are characterized by good mechanical properties. The materials have a density according to DIN 53 420 of from 250 to 1400 kg/m³, preferably of from 1000 to 1200 kg/m³ for non-cellular elastomers and preferably of from 400 to 1100 kg/m³ and more preferably of from 450 to 1000 kg/m³ for cellular or micro-cellular elastomers. Such elastomers having a density according to DIN 53 420 of from 800 to 1400 kg/m³, have a tensile strength according to DIN 53 504 of from 15 to 45N/mm², preferably of from 18 to 33N/mm², an elongation at break according to DIN 53 504 of from 40 to 400 percent, more preferably of from 110 to 350 percent; a tear propagation strength according to DIN 53 515 of from 35 to 140N/mm, more preferably of from 40 to 120N/mm; a Shore-D hardness according to DIN 53 505 of from 40 to 80, more preferably of from 45 to 75; a modulus of elasticity according to DIN 53 457 of from 300 to 1800 and a temperature of deflection under a load according to ISO-75/B (DIN 53 461) of from 80° C. to 205° C., more preferably of from 90° C. to 185° C.

The subject of the invention is in addition a process for the preparation of elastic molded articles based on the said elastomers containing polyamide groups and polyurea groups in bonded form according to claim 6, whereby the non-cellular or cellular molded articles are preferably prepared using RIM technology in a closed, tempered mold.

The said elastomers containing polyamide groups and polyurea groups in bonded form demonstrate a high temperature resistance, and are able to be subject to, for example, a one hour annealing at 200° C., without having the materials lose their original mechanical properties, like, for example tensile strength and elongation.

The polyamidepolyurea molded articles prepared using RIM technology and while using polyazomethines, preferably polyketimines, demonstrate clearly fewer processing errors, like for example porosity, hammer blows, etc., in comparison to the commercially available polyurethane molded articles, polyurethanepolyurea molded articles or the polyurea molded articles. The molded articles are able to tolerate without problems the temperature conditions arising with on-line painting. The polyazomethines used according to the process of this invention have lower viscosities comparable with aliphatic polyoxyalkylene-polyamines and are able to be processed into elastomers alone or in mixtures with polyoxyalkylene-polyamines and/or aromatic alkylsubstituted primary polyamines with organic, preferably aromatic polyisocyanates in the presence of or preferably in the absence of tertiary amines, and particularly in the absence of metal salt catalysts.

The low viscosity polyazomethines form low viscosity RIM formulations having improved flowability with the other starting components, as well as optionally catalysts, blowing agent, additives and auxiliaries. These surprisingly cure very quickly by themselves in the absence of metal salt catalysts, in spite of their extended gel times so that the molded articles may be demolded problem-free even after a relatively short time, for example, preferably after 10 to 15 seconds depending on the size and volume; and 4 mm thick test plaques are able to endure an immediate bending to 180°. By the decreased viscosity of the formulation and the extended gel time, moreover the output quantity is able to be clearly increased using conventional high pressure machines, so that even large volume molds are able to be filled without difficulties.

The following may be noted regarding the starting materials used in the preparation of the said elastomers containing polyamide groups and polyurea groups in bonded form:

Typical organic polyisocyanates are aliphatic, cycloaliphatic and preferably multivalent isocyanates. Individual examples are: 1,6-hexamethylenediisocyanate, 1-isocyanato-3,5,5-trimethy-1-3-isocyanatomethylcyclohexane, 2,4-and 2,6-hexahydrotoluenediisocyanate, as well as the corresponding isomeric mixtures, 4,4'-, 2,2'- and 2,4'-dicyclohexylmethanediisocyanate, as well as the corresponding isomeric mixtures, mixtures of 4,4'-, 2,2'-and 2,4'-dicyclohexylmethanediisocyanate and polymethylene-polycyclohexylenepolyisocyanates, 2,4- and 2,6-toluenediisocyanate and the corresponding isomeric mixtures, 4,4'-, 2,4'- and 2,2'-diphenylmethanediisocyanate and the corresponding isomeric mixtures, mixtures of 4,4'-, 2,4'- and 2,2'-diphenylmethanediisocyanates and polyphenyl polymethylene polyisocyanates (crude-MDI) and mixtures of crude-MDI and toluene diisocyanates.

Frequently used are the so-called modified multivalent isocyanates, i.e. products which are obtained through chemical reactions of the above diisocyanates and/or polyisocyanates. Examples are polyisocyanates containing the following groups; esters, ureas, buirets, allophanates and preferably carbodiimides, isocyanurate and/or urethane group containing diisocyanates and/or polyisocyanates. Individual examples are: aromatic polyisocyanates containing urethane groups, having NCO contents of from 8 to 33.6 weight percent, more preferably of from 21 to 31 weight percent, for example with lower molecular weight diols, triols, oxyalkylene glycols, dioxyalkylene glycols or polyoxyalkyleneglycols having molecular weights up to 800, modified 4,4'-diphenylmethanediisocyanate or toluenediisocyanate, whereby they are able to be employed individually or in mixtures as di- and/or polyoxyalkyleneglycols; individual examples are: diethylene glycols, dipropylene glycols, polyoxyethyleneglycols, polyoxypropylene glycols and polyoxypropylenepolyoxyethylene glycols. Suitable also are prepolymers containing NCO groups, having NCO contents of from 8 to 25 weight percent, more preferably of from 14 to 21 weight percent. Also suitable are polyisocyanates containing liquid carbodiimide groups and/or isocyanurate rings, having NCO contents of from 8 to 33.6 weight percent, more preferably from 21 to 31 weight percent, for example, based on 4,4'-, 2,4'- and/or 2,2'-diphenylmethanediisocyanate and/or 2,4- and/or 2,6-toluenediisocyanate and preferably 2,4- and 2,6-toluenediisocyanate, as well as the corresponding isomeric mixtures 4,4'-, 2,4'- and 2,2'-diphenylmethanediisocyanate, as well as the corresponding isomeric mixtures for example from 4,4'- and 2,4'-diphenylmethanediisocyanates; mixtures of diphenylmethanediisocyanates and polyphenylpolymethylenepolyisocyanates (crude MDI) and mixtures of toluenediisocyanates and crude-MDI.

Most preferably used are: (i) polyisocyanates containing carbodiimide groups and/or urethane groups, from 4,4'-diphenylmethanediisocyanate or a mixture of 4,4'- and 2,4'-diphenylmethanediisocyanates having an NCO content of from 8 to 33.6 weight percent; (ii) prepolymers containing NCO groups, having an NCO content of from 8 to 25 weight percent, based on the weight of the prepolymer, prepared by the reaction of polyoxyalkylene polyols, having a functionality of from 2 to 4 and a molecular weight of from 600 to 6000 with 4,4'-diphenylmethanediisocyanate or with a mixture of 4,4'- and 2,4'-diphenylmethanediisocyanates and mixtures of (i) and (ii).

As previously stated, polyoxyalkylene polyols are suitable for preparing the prepolymers containing NCO groups; the polyoxyalkylene polyols have a functionality of from 2 to 4, more preferably of from 2 to 3, and most preferably 3, and have a molecular weight of from 600 to 6000, more preferably of from 2000 to 4500. Analogous polyoxyalkylene polyols having molecular weights of from about 132 to 10,000 are used for the preparation of polyoxyalkylenepolyamines; the starting materials for the preparation of polyazomethines (b). Such polyoxyalkylene polyols may be prepared by known methods, for example the anionic polymerization with alkali hydroxides, like sodium hydroxide or potassium hydroxide, or alkali alcoholates, like sodium methylate, sodium or potassium ethylate or potassium isopropylate as catalysts or by the cationic polymerization with Lewis acids such as antimony pentachloride, boron triflouride etherate, etc. or bleaching earth as catalysts, with one or more alkylene oxides having from 2 to 4 carbon atoms in the alkylene radical and an initiator molecule, which contains from 2 to 4, more preferably from 2 to 3, reactive hydrogen atoms in bonded form.

Suitable alkylene oxides are, for example, 1,3-propylene oxide, 1,2- respectively 2,3-butylene oxide and preferably ethylene oxide and 1,2-propylene oxide. Tetrahydrofuran may also be used. The alkylene oxide may be used individually, alternating one after another or as mixtures. Typical initiators are: water, organic dicarboxylic acids, such as succinic acid, adipic acid, phthalic acid and terephthalic acid, aliphatic and aromatic, optionally N-mono-, N,N- and N,N'-dialkyl substituted diamines having from 1 to 4 carbon atoms in the alkyl radical, such as optionally mono- and dialkyl substituted ethylenediamine, diethylenetriamine, triethylenetetramine, 1,3-propylenediamine, 1,3- respectively 1,4-butylenediamine, 1,2-, 1,3-, 1,4-, 1,5- and 1,6-hexamethylenediamine, phenylenediamines, 2,4- and 2,6-toluenediamine and 4,4'-, 2,4'- and 2,2'-diaminodiphenylmethane.

Typical initiators are also alkanolamines, such as ethanolamine, diethanolamine, N-methyl- and N-ethylethanolamine, N-methyl- and N-ethyl-diethanolamine and triethanolamine, ammonia and hydrazine. Preferably used are multivalent, most preferably divalent alcohols and/or trivalent alcohols, such as ethanediol, 1,2-propanediol and 1,3-propanediol, triethylene glycol, dipropylene glycol, 1,4-butanediol, 1,6-hexandediol, glycerin, trimethylolpropane and pentaerythritol.

The polyoxyalkylenepolyols may be used individually or in mixtures.

Polyazomethines (b) in the context of this invention are reaction products of polyoxyalkylene-polyamines having from 2 to 4, preferably from 2 to 3, primary amino groups in bonded form on the aromatic or preferably on the aliphatic radical, and having an average molecular weight of from 180 to 10,000, more preferably of from 180 to 5500, most preferably 1100 to 5500, with at least one organic aldehyde and/or preferably at least one organic ketone.

The preferably used polyoxyalkylenepolyamines having amino groups in bonded form on the aliphatic radical, can be prepared according to conventional processes; for example by the cyanoalkylation of the aforesaid polyoxyalkylene polyols and subsequent hydrogenation of the nitrile which forms (U.S. patent application Ser. No. 3,267,050) or by the amination of polyoxyalkylene polyols with ammonia in the presence of hydrogen and catalysts (DE-A-No. 12 15 373).

Suitable polyoxyalkylenepolyamines having amino groups in bonded form on the aromatic radical may be prepared, for example, by reacting the above mentioned polyoxyalkylenepolyols with aromatic polyisocyanates in a ratio of NCO:OH groups of at least 2 and then subsequent hydrolysis of the resulting prepolymers containing aromatic NCO groups into polyamines analogous to the processes described in: DE-A-Nos. 29 48 419, 30 39 600, EP-A-Nos. 84 141, 79 512, 97 290, 97 298, 97 299, 99 537, 113 027, 113 020 or 154 768.

The polyoxyalkylenepolyamines may be employed as individual compounds or in mixtures from products having different molecular weights and functionalities. When using polyoxyalkylenepolyols having molecular weights smaller than 180, for example from lower molecular weight polyoxyethylene glycols, as starting components, it is necessary that the resulting polyoxyalkylenepolyamines are mixed together with higher molecular weight polyoxyalkylenepolyamines in such a quantity that the average molecular weight is from 180 to 10,000 at a functionality of from 2 to 4. In addition, mixtures of polyoxyalkylenepolyols and polyoxyalkylenepolyamines and/or partially aminated polyoxyalkylenepolyols are able to be used as polyoxyalkylenepolyamines, provided that at least 50 percent, more preferably at least 64 percent and most preferably more than 90 percent of the reactive terminal groups are amino groups, and that these groups are preferably up to 85 percent, more preferably up to more than 90 percent, primary amino groups.

Other starting components for the preparation of the polyazomethines are organic, preferably aliphatic and/or cycloaliphatic aldehydes and/or particularly organic, preferably aliphatic and/or cycloaliphatic ketones or mixtures of the said compounds. Typical aldehydes are: acetaldehyde, 3-methoxy-, 3-ethoxy-, 3-propoxy-, 3-isopropoxy-, 3-n-butoxy- and 2-ethylhexoxy- 2,2-dimethylpropanal, 2-formylisobutyric-alkylester having from 1 to 4 carbon atoms in the alkyl radical, e.g., 2-formylisobutyricethylester, 3-(methylcarbonyloxy)- and 3-(isopropylcarbonyloxy)- 2,2-dimethyl-propanal, (methoxyacetoxy)-2,2-dimethylpropanal, 2-acetoxy-2-methyl-propanal, and particularly 2-formylisobutyricmethylester and 2,2-dimethylpropanal. Examples of aliphatic and/or preferably cycloaliphatic ketones are: acetone, methylethylketone, diethylketone, methylpropylketone, methylisopropylketone, methyl-n-butylketone, diisopropylketone, phenylmethylketone, more preferably methylisobutylketone, methylcyclohexanone and most preferably cyclopentanone and cyclohexanone.

For the preparation of the polyazomethines from the group of polyaldimines and preferably from polyketimines, the polyoxyalkylenepolyamines, more preferably the polyoxyalkylenediamines and/or polyoxyalkylenetriamines, are mixed together with an excess of at least one aldehyde and/or preferably ketone, preferably in an —NH2/—CHO— and/or —CO—ratio of from 1:1 to 1:5, and most preferably of from 1:1 to 1:4. After adding a suitable solvent or diluent, such as for example toluene, xylene, benzene, methylene chloride, dichloroethane, cyclohxane, n-hexane or heptane and optionally an inorganic or organic acid, such as for example hydrochloric acid, formic acid or benzoic acid or arylsulfonic acids as for example p-toluenesulfonic acid, as catalysts; the mixture is heated in the presence of an inert gas under the reaction conditions using a water separator until the theoretically expected amount of water has separated, or until the desired amount of water has separated with a partial reaction. Generally, reaction times of from 1 to 60 hours, more preferably of from 5 to 40 hours are required. Such processes are for example described by Houben-Weyl, *Methods of Organic Chemistry*, Volume VII/2b, part II, George Thieme Verlag, Stuttgart 1976, 4th edition, ppg. 1948 and following.

Purifying the polyazomethines, for example by filtration, is generally not necessary. The polyazomethines may be directly used for the preparation of the said elastomers containing polyamide groups and polyurea groups in bonded form, after distilling off the excess aldehyde and/or ketone and in the event that the mixture was condensed in the presence of a solvent or diluent, after distilling off the preferably used solvent or diluent.

Polyketimines are especially suited as polyazomethines. These are prepared by the reaction of polyoxyalkylenepolyamines, having a functionality of from 2 to 4 and a molecular weight of from 180 to 10,000, selected from the group of polyoxyethylenepolyamines, polyoxypropylenepolyamines, polyoxytetramethylenepolyamines, polyoxypropylenepolyoxyethylenepolyamines, polyoxytetramethylenepolyoxypropylenepolyamines and/or polyoxyethylenepolyamines, with aliphatic and/or cycloaliphatic ketones; selected from the group consisting of methylisobutylketone, methylcyclohexanone and preferably cyclohexanone and cyclopentanone, whereby in the preparation of the elastomers containing polyamide groups and polyurea groups in bonded form preferably polyoxyalkylenepolyamines or polyoxyalkylene mixtures are used having an average molecular weight of from 1100 to 5500.

In place of the polyazomethines in the preparation of the elastomers containing polyamide groups and polyurea groups in bonded form, mixtures can also be used composed of the aforesaid polyoxyalkylenepolyamines and polyaldemines and/or preferably polyketimines. Such mixtures may be obtained for example by mixing polyoxyalkylenepolyamines with the prepared polyazomethines. However, a preferred embodiment states reacting the polyoxyalkylene-polyamines used with an excess amount of aldehyde and/or preferably ketone, so that the amino groups present are only partically converted into azomethine groups. Typical mixtures are of polyoxyalkylenepolyamines and polyazomethines, more preferably polyketimines, in such quantities that these possess: from 10 to 90 percent, more preferably from 30 to 60 percent, and most preferably from 30 to 50 percent primary amino groups from polyoxyalkylene-polyamines having a functionality of from 2 to 4 and an average molecular weight of from 180 to 10,000 and from 90 to 10 percent, more preferably from 70 to 40 percent, and most preferably from 70 to 50 percent of azomethine groups, particularly ketimine groups, from polyazomethines, particularly polyketimines, prepared by reacting the aforesaid polyoxyalkylenepolyamines with at least one aliphatic and/or cycloaliphatic aldehyde and preferably aliphatic and/or cycloaliphatic ketone, whereby the percents are based on the total of amino groups and aldimine groups or more preferably based on the ketimine groups.

Primary aromatic diamines are efficaciously used as alkylsubstituted aromatic polyamines having molecular weights up to 500, preferably of from 122 to 400; which have at least one alkyl substituent in the ortho position relative to the amino groups, which diminish the reactivity of the amino groups by steric hindrance. They are liquid at room temperature and are at least partially miscible with the polyazomethines under the processing conditions, more preferably however they are completely miscible. Proven to be successful are, e.g. alkyl-substituted meta-phenylene diamines having the following structural formulas:

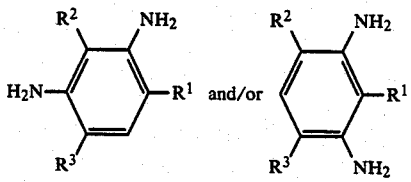

in which $R^2$ and $R^3$ are the same or different, and stand for either a methylradical, ethyl radical, propyl radical or isopropyl radical and $R^1$ is a linear or branched alkyl radical having from 1 to 10, more preferably from 1 to 6 carbon atoms. Proven to be very successful also are branched alkyl radicals $R^1$ having from 4 to 6 carbon atoms in which the branched position rests on the $C_1$ carbon atom. Typical examples of radicals $R^1$ are: methyl-, ethyl-, isopropyl-, 1-methyloctyl-, 2-ethyloctyl-, 1-methylhexyl-, 1,1-dimethylpentyl-, 1,3,3-tri-methyl-hexyl-, 1-ethylpentyl-, 2-ethylpentyl-, cyclohexyl-, 1-methyl-n-propyl-, tert.-butyl-, 1-ethyl-n-propyl-, 1-methyl-n-butyl- and 1,1-dimethyl-n-propyl-radical.

Typical alkyl substituted m-phenylenediamines are: 2,4-dimethylcyclohexyl-, 2-cyclohexyl-4,6-diethyl-, 2-cyclohexyl- 2,6-isopropyl-, 2,4-dimethyl-6-(1-ethyl-n-propyl)-, 2,4-dimethyl-6-(1,1-dimethyl-n-propyl)-, and 2-(1-methyl-n-butyl)-4,6-dimethyl 1,3-phenylene diamine. Preferably used are 1-methyl-3,5-diethyl-2,4- and/or -2,6-phenylendiamines, 2,4-dimethyl-6-tert.-butyl-, 2,4-dimethyl-6-isooctyl- and 2,4-dimethyl-6-cyclohexyl-1,3-phenylenediamine.

Other typical examples are 3,3'-di- and/or 3,3',5,5'-tetra-n-alkyl-substituted 4,4'-diaminodiphenylmethanes such as for example 3,3'-dimethyl-, 3,3'-diethyl-, 3,3'-di-n-propyl-, 3,3',5,5'-tetramethyl-, 3,3',5,5'-tetraethyl- and 3,3',5,5'-tetra-n-propyl-4,4'-diaminodiphenylmethane.

Preferably used as alkyl substituted 4,4'-diaminodiphenylmethanes are those having the structural formula:

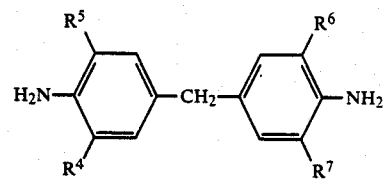

in which $R^4$, $R^5$, $R^6$, and $R^7$ are the same or different and may be a methyl radical, ethyl radical, propyl radical, isopropyl radical, sec.-butyl radical and tert.-butyl radical whereby at least one of the radicals must be an isopropyl radical or a sec.-butyl radical. The 4,4'-diamino-diphenylmethanes can also be used in mixtures with isomers having the following structural formulas:

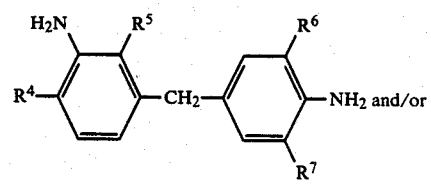

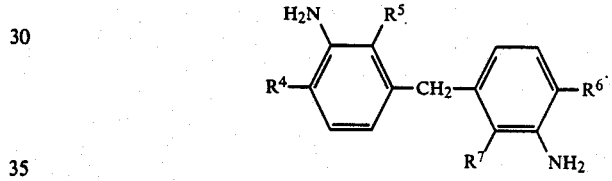

whereby $R^4$, $R^5$, $R^6$, and $R^7$ are the same as above

Typical exapmles are 3,3',5-trimethyl-5'-isopropyl.-, 3,3',5-triethyl-5'-isopropyl-, 3,3',5-trimethyl-5'-sec.-butyl-, 3,3',5'triethyl-5'-sec.butyl-4,4'-diaminodiphenylmethane, 3,3'-dimethyl-5,5'-diisopropyl-, 3,3'-diethyl-5,5'-diisopropyl-, 3,3'-dimethyl-5,5'-di-sec.-butyl-, 3,3'-diethyl-5,5'-disec.-butyl-, 3,5-dimethyl-3',5'-diisopropyl-, 3,5-diethyl-3',5'-diisopropyl-, 3,5'-dimethyl-3',5-di-sec.-butyl-, 3,5-diethyl-3',5'-di-sec.-butyl-4,4'-diaminodiphenylmethane, 3-methyl-3',5,5'-triisopropyl , 3-ethyl- 3'5,5'-triiisopropyl, 3-methyl-3'-ethyl-5,5'-diisopropyl-, 3-methyl-3'-, 5,5'-tri-sec.-butyl-, 3-ethyl-3',5,5'-tri-sec.-butyl-4,4'-diaminodiphenylmethane, 3,3'-diisopropyl-5,5'-di-sec.-butyl-, 3,5-diisopropyl-3',5'-di-sec.-butyl-, 3-methyl-5-tert.-butyl-3',5'-diisopropyl-, 3-ethyl-5-sec.-butyl-3'-methyl-5'-tert.-butyl-, 3,3',5,5'-tetraisobutyl- and 3,3',5,5'-tetra-sec.-butyl-4,4'-diaminodiphenylmethane. Preferably used are 3,5-dimethyl-3',5'-diisopropyl- and 3,3',5,5'-tetra-isopropyl-4,4'-diaminodiphenylmthane. The diaminodiphenylmethanes can be used individually or as mixtures.

For preparing the elastomers containing polyamide groups and polyurea groups in bonded form and molded articles from these, preferably used are the commercially easily available 1,3,5-triethyl-2,4-phenylenediamine, 1-methyl-3,5-diethyl-2,4-phenylenediamine, mixtures of 1-methyl-3,5-diethyl-2,4- and -2,6-phenylenediamines, so-called Detda, isomeric mixtures of 3,3'-di- or 3,3',5,5'-tetraalkyl substituted 4,4'-diaminodiphenylmethanes having from 1 to 4 carbon atoms in the alkyl radical, particularly 3,3',5,5'-tetralkyl substituted 4,4'-diaminodiphenylmethanes containing in bonded form methyl radicals, ethyl radicals, and isopropyl radicals as well as mixtures of the said tetraalkyl substituted 4,4'-diaminodiphenylmethanes and Detda.

In order to prepare the said elastomers, the organic polyisocyanates and/or modified polyisocyanate mixtures (a), polyazomethines (b) and the alkyl substituted primary aromatic polyamines (c) are reacted in such amounts that the equivalent ratio of NCO groups in the components (a), to the total of the reactive hydrogen atoms in the components (b) and (c) is from 1:0.85 to 1:1.25, more preferably from 1:0.95 to 1:1.15 and most preferably 1:0.98 to 1:1.10, and the ratio of azomethine groups or the total of azomethine groups and amino groups in the components (b) to the primary aromatic amino groups in components (c) is from 95 to 60 to 5 to 40, more preferably from 80 to 73 to 20 to 27.

The said elastomers containing polyamide groups and polyurea groups in bonded form are preferably prepared in the absence of catalysts. However, if catalysts are to be used, particularly strongly basic amines are used, whereby for achieving temperature resistant molded articles, which are able to be subject to on-line painting, the absence of synergistic organic metal compounds, for example, organic tin compounds, is obligatory. Individual examples of typical catalysts are: amines such as e.g. 2,3-dimethyl-3,4,5,6-tetrahydropyrimidine and tertiary amines, such as e.g. triethylamine, tributylamine, dimethylbenzylamine, N-methyl-, N-ethyl, N-cyclohexylmorpholine, N,N,N',N'-tetramethylethylenediamine, N,N,N',N'-tetramethylbutanediamine, pentamethyldiethylentriamine, tetramethyldiaminoethylether, bis-(dimethylaminopropyl)-urea, dimethylpiperazine, 1,2-dimethylimidazole, 1-aza-bicyclo-(3,3,0)-octane and preferably 1,4-diaza-bicyclo-(2,2,2)-octane.

Typical catalysts are also: Tris-(dialkylaminoalkyl)-s-hexahydrotriazines, especially tris-(N,N-diethylaminopropyl)-s-hexahydrotriazine, tetraalkyl ammonium hydroxides, such as e.g. tetramethyl ammonium hydroxide, alkali hydroxides, such as e.g. sodium hydroxide and alkali alcoholates, such as e.g. sodium methylate and potassium isopropylate, as well as alkali salts of long chain fatty acids having from 10 to 20 carbon atoms and optionally pendent OH groups. Commonly used are from 0.001 to 5 weight percent, more preferably from 0.05 to 2 weight percent of catalyst, based on the weight of the (b) component.

In order to prepare elastic molded articles based on the said elastomers containing polyamide groups and polyurea groups in bonded form, optionally also blowing agent (e), for achieving cellular molded articles, as well as optionally auxiliaries (f) and/or additives (g) can be incorporated into the reaction mixture composed of components (a) through (c) as well as optionally (d).

Water, which reacts with the isocyanate groups to form carbon dioxide, is a typical example of a blowing agent in the preparation of cellular molded articles. The amount of water which is efficaciously used is from 0.1 to 1.0, more preferably from 0.2 to 0.4 weight percent, based on the weight of the components (b) and (c).

Other blowing agents which may be used are low boiling-point liquids which vaporize under the influence of the exothermic addition polymerization reaction. Liquids which are suitable are inert to the organic polyisocyanate and which have boiling points below 100° C. Examples of such preferably used liquids include halogenated hydrocarbons like methylene chloride, trichlorofloromethane, dichlorodifluoromethane, dichloromonofluoromethane, dichlorotetrafluoroethane and 1,1,1-trichloro-1,2,2-trifluoroethane. Mixtures of these low boiling-point liquids can be used with one another and/or with other substituted or unsubstituted hydrocarbons.

The most desirable amount of low-boiling-point liquid used in preparing cellular molded articles from the polyamide and polyurea containing elastomers depends on the density which is desired, as well as on whether water is also used. Generally amounts of from 1 to 15 weight percent, more preferably of from 2 to 11 weight percent, based on the weight of the components (b) and (c), provide satisfactory results.

Typical examples of suitable auxiliaries (f) and/or additives (g) are: surfactants, foam stabilizers, cell regulators, fillers, reinforcing agents, flame retardants, external and/or internal release agents, colorants, pigments, agents to protect against hydrolysis, fungistats and bacteriostats.

Surfactants which may be used are those compounds which are used to support the homogeneization of the starting components, and which also may be suitable for regulating the cell structure. Typical examples are emulsifiers, such as the sodium salts of ricinoleic sulfates or from fatty acids, as well as salts of fatty acids having amines, e.g. oleic acid diethanolamine, stearic acid diethanolamine, ricinoleic acid diethanolamine, salts of sulfonic acids, e.g. alkali salts or ammonium salts of dodecylbenzoic acid or dinaphthylmethanedisulfonic acid and ricinoleic acids; foam stabilizers, like siloxaneoxyalkylene mixed polymers and other organo polysiloxanes, oxyethylated alkylphenols, oxyethylated fatty alcohols, paraffin oils, ricinoleic ester and/or ricinoleic acid, Turkey red oil and peanut oil and cell regulators, like paraffins, fatty alcohols and dimethylpolysiloxanes. The surfactants are generally used in amounts of from 0.01 to 5 parts of weight, based on 100 parts by weight of the components (b) and (c).

The fillers which may be used, especially reinforcing fillers, include the essentially conventional organic and inorganic fillers, reinforcing agents, weight increasing agents, agents to improve paint wear, coating agents, etc. Typical examples are: inorganic fillers such as silicate minerals, for example lamellar silicates such as antigorite serpentine, horn blends, amphibole, chrysotile, talcum, metal oxides such as kaolin, aluminum oxide, titanium oxides, and iron oxides; metal salts such as chalk, heavy spar and inorganic pigments like cadmium sulfide, zinc sulfide as well as glass, and others. Preferably used are kaolin (China clay), aluminum silicate and coprecipitates of barium sulfate and aluminum silicate as well as both natural and synthetic fibrous minerals, such as wollastonite and particularly glass fibers of different lengths which also may be sized. Typical organic fillers are: coal, melamine, pine resin, cyclopentadienes and graft polymers based on styrene acrylonitrile, which are prepared by in situ polymerization of acrylonitrile-styrene mixtures in polyether polyols analogous to the Federal Republic of Germany specifications Nos. 11 11 394, 12 22 669, (U.S. Pat Nos. 3,304,273, 3,383,351, 3,523,093), 11 52 536 (GB No. 1 040 452) and 11 52 537 (GB No. 987 618), and thereafter aminated as well as filler polyoxyalkylenepolyamines, in which the aqueous polymer dispersions are converted into polyoxyalkylenepolyamine dispersions.

The inorganic and organic fillers can be used individually or in mixtures. Preferably used are sized short glass fibers having lengths smaller than 0.4 mm, more preferably smaller than 0.2 mm.

The inorganic and/or organic fillers and/or reinforcing agents are incorporated into the reaction mixture advantageously in amounts of from 0.5 to 35 weight percent, more preferably from 3 to 20 weight percent, based on the weight of the components (a) through (c).

Typical flame retardants are, e.g.: tricresylphosphate, tris-2-chloroethyl phosphate, tris-chloropropyl phosphate and tris-2,3-dibromopropyl phosphate.

In addition to the halogen-substituted phosphates cited above, also inorganic flame retardants may be used, for example: aluminum hydroxide, antimony trioxide, arsenic oxide, ammonium polyphosphate and calcium sulfate and/or melamine which make the molded articles flame-resistant. Generally, it has been found preferable to use from 5 to 50 parts by weight, more preferably from 5 to 25 parts by weight of the said flame retardants for each 100 parts by weight of the components (b) and (c).

Further information concerning the above-described conventional auxiliaries and/or additives is found in the technical literature; e.g. in the monograph by J. H. Saunders and K. C. Frisch *High Polymers*, volume XVI, *Polyurethanes*, parts 1 and 2, Interscience Publishers, 1962 and/or 1964, or found in the *Plastics Handbook* Polyurethanes, Volume VII, Hanser-Verlag, Munich and Vienna, First and Second Editions, 1966 and 1983.

The elastic, non-cellular or cellular molded articles based on the said elastomers containing polyamide groups and polyurea groups in bonded form are prepared using a one-shot process with the help of low pressure technology or more preferably using reaction injection molding technology (RIM) in open or in preferably closed moles. Reaction injection molding technology is described, for example, by H. Piechota and H. Röhr in *Integral Skin Foams*, Carl Hanser-Verlag, Munich, Vienna, 1975; or D. J. Prepelka and J. L. Wharton in the *Journal of Cellular Plastics*, March/April 1975, ppg. 876 through 98 and by U. Knipp in *Journal of Cellular Plastics*, March/April 1973, pg. 76–84.

When using a mixing chamber which has several feed nozzles, the starting components can be fed in individually and then mixed intensively in the mixing chamber. It has proven to be particularly advantageous to employ the two-component process, and to incorporate the components (b) and (c) and optionally (d) through (g) into the (A) component, and to use organic polyisocyanates or modified polyisocyanate mixtures as the (B) component. Here the advantage is that, for example, the (A) and (B) components can be stored separately and can be transported in a space-saving manner, so that they only need to be mixed together in the proper amounts for processing.

The amount of reaction mixture injected into the mold is measured so that the resulting optionally cellular molded articles have a density of from 250 kg/m³ to 1400 kg/m³, whereby the non-cellular molded articles preferably have a density of from 1000 kg/m³ to 1400 kg/m³, the cellular and microcellular molded articles preferably have a density of from 400 kg/m³ to 1100 kg/m³, e.g. for shoe soles the density is from 450 kg/m³ to 750 kg/m³ and for covering elements the density is from 700 kg/m³ to 1100 kg/m³. The initial components are injected into the mold at a temperature from 15° C. to 80° C., more preferably from 30° C. to 65° C. The mold temperature is efficaciously from 20° C. to 90° C., more preferably from 30° C. to 70° C. The degree of compression for preparing microcellular or cellular molded articles ranges between 1.1 and 8, more preferably betwee 2 and 6.

Although the elastomer molded articles are easily demoldable, it can be advantageous to treat the inside of the mold with a conventional external release agent, for example, based on either wax or silicone to improve demolding. Having been proven especially successful and therefore preferably used are internal mold release agents, such as those disclosed in EP-A-No. 153 639, EP-A-No. 180 749 (AU No. 85/47 498), EP-A-No. 173 888 (U.S. Pat. No. 4,519,965), WO No. 84/03288 (EP-A-No. 119 471) and WO No. 86/01215. The mold times depend on the size and geometry of the molded article, and are on the average from 30 to 60 seconds.

The non-cellular molded articles obtained according to the process of this invention are particularly useful in both the automobile and aircraft industries; for example, as bumpers, impact protection moldings, body parts, such as for example, drip moldings, fenders, spoilers, wheel house extension, as well as for other engineering housing components and rollers. The cellular molded articles are suited for shoe soles, armrests, headrests, sun visors, safety coverings in the interior of automobiles, as well as for seats for motorcycles, tractors, or bicycles, as seat cushions and as safety coverings for composite foams.

A. PREPARATION OF THE POLYAZOMETHINES

Example 1

690 g of a polyoxypropylenediamine having the structure:

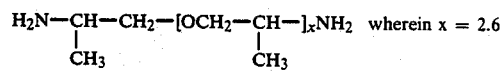

and having an average molecular weight of 230 and having at least 91 weight percent of primary amino groups (Jeffamine ® D-230 from the Texaco Co.) was mixed together with 647 g of cyclohexanone and 300 ml of toluene and then heated using reflux cooling on the water separator until no more water separated off (time about 10 hours). Subsequently, the solvent and excess cyclohexanone were distilled off under reduced pressure at from 100° C. to 120° C.

The infrared spectrum indicated a strong ketimine band at 1662 cm$^{-1}$. The viscosity of the residue at 25° C. was 80 mPas.

Example 2

600 g of a polyoxypropylenetriamine having the structure:

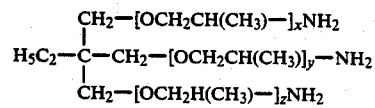

wherein x + y + z = ca. 5.3 and having an average molecular weight of 440 and having at least 87 weight percent of primary amino groups (Jeffamine ® T-403 from the Texaco Co.) was mixed together with 441 g cyclohexanone and 300 ml of toluene and then heated using reflux cooling on the water separator until no more water separated off (time about 10 hours). Following this, the solvent and excess cyclohexanone were distilled off under reduced pressure at from 100° C. to 120° C. The viscosity of the residue at 25° C. was 840 mPas. The IR-spectrum indicated a strong ketimine band at 1662 cm$^{-1}$.

Example 3

2500 g of a polyoxypropylenediamine having the structure:

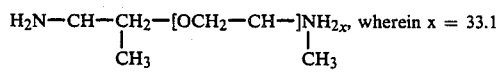

and having an average molecular weight of 2000 with at least 91 weight percent of primary amino groups (Jeffamine ® D-2000) was mixed together with 269.5 g cyclohexanone and 650 ml n-hexane, and then heated using reflux cooling on the water separator until no more water separated off (time about 20 hours). Subsequently, the n-hexane and excess cyclohexanone were distilled off under reduced pressure at 120° C. The viscosity of the residue at 25° C. was 320 mPas. The ketimine band showed up at 1660 cm$^{-1}$ in the IR-spectrum.

Example 4

2500 g of the polyoxypropylenediamine used in Example 3 was mixed together with 308 g of an isomeric mixture having an average molecular weight of 112, which contained 65 weight percent of 3-methylcyclohexanone, 25 weight percent of 4-methylcyclohexanone and 8 weight percent cyclohexanone and 650 ml toluene, and then heated using reflux cooling on the water separator until no more water separated off (time about 12 hours). The viscosity of the residue at 25° C. was 430 mPas. The IR-spectrum indicated the ketimine band at 1662 cm$^{-1}$.

Example 5

2500 g of the polyoxypropylenediamine used in Example 3, was mixed together with 276 g of methylisobutylketone and 850 ml toluene as well as 10 ml of formic acid and then heated using reflux cooling on the water separator until no more water had separated off (time about 60 hours). Subsequently, the excess ketone and the solvent were distilled off under reduced pressure and from 100° C., to 120° C. The viscosity of the residue obtained was 300 mPas at 25° C. In the IR-spectrum, a weak ketimine band was visible at 1661 cm$^{-1}$.

Example 6

2500 g of the polyoxypropylenediamine used in Example 3 was mixed together with 231 g of cyclopentanone and 6509 ml toluene and then heated using reflux cooling on the water separator until no more water separated off (time about 9 hours). Finishing occurred analogous to the procedure of Example 2. The viscosity of the polyetherdiketimine obtained was 375 mPas. The ketimine band showed up in the IR-spectrum at 1679 cm$^{-1}$.

Example 7

4000 g of the polyoxypropylenetriamine having the structure described in Example 2, however, having an average molecular weight of 5000 and about 70 weight percent of primary amino groups (Jeffamine ® T 5000 from the Texaco Co.) was mixed together with 259 ml cyclohexanone and 1000 ml of toluene, and then heated using reflux cooling on the water separator until no more water separated off (time about 10 hours). Finishing occurred analogous to the procedure of Example 3. The viscosity of the polyether triketimine was 424 mPas. The IR-spectrum indicated a weak ketimine band at 1663 cm$^{-1}$.

B. PREPARATION OF THE ELSATOMERS CONTAINING POLYAMIDE GROUPS AND POLYUREA GROUPS IN BONDED FORM

General Preparation Procedure

The starting components were processed on a high pressure proportioning machine of the type Puromat ® 30 from Elastogran Maschinenbau. The temperature of the A components was, if not otherwise noted, 65° C. and the temperature of the B components was always 40° C. The metal mold had internal dimensions of 400×200×4 mm, and, if not otherwise noted, had a temperature of 65° C. The demold time was from 15 to 20 seconds. The parts cited in the examples refer to parts by weight.

Example 8

A-Component:
A mixture containing:
20.0 parts by weight of the polyoxypropylenetriketimine prepared according to Example 7,
60.0 parts by weight of a polyoxypropylenediamine having an average molecular weight of 200 with at least 91 weight percent of primary amino groups (Jeffamine ® D-2000 from the Texaco Co.) and
20.0 parts by weight of a mixture composed of 80.0 parts of 1-methyl-3,5-diethyl 2,4-phenylenediamine and 20.0 parts of 1-methyl-35-diethyl-2,6-phenylenediamine; which will now be abbreviated as DETDA.

B-Component:
4,4'-diisocyanatediphenylmethane, modified, having carbodiimide groups, and having an NCO content of 29.5 weight percent.

The A and B components were processed in a mixing ratio of A:B=100:44.2, using an index of 105. Both the component and mold temperatures were 50° C.

The following physical properties were measured on a molded article annealed at 120° C. for one hour:

| Density | DIN 53 420 | [kg/m$^3$]: | 1140 |
|---|---|---|---|
| Tensile Strength | DIN 53 504 | [N/mm$^2$]: | 28 |
| Elongation at Break | DIN 53 504 | [%]: | 290 |
| Tear Propagation Strength | DIN 53 515 | [N/mm]: | 96 |
| Hardness | DIN 53 505 | Shore D: | 57 |
| Modulus of Elasticity | DIN 53 457 | [N/mm$^2$]: | 380 |
| Temperature of Deflection Under a Load (HDT) according to ISO-75/B | DIN 53 461 | [°C.]: | 132 |

Example 9

A-Component:
A mixture containing:
27 parts of a polyoxypropylenetriketimine, prepared according to the procedure of Example 7,
3 parts of a polyoxypropylenetriamine having an average molecular weight of 440 and at least 87 weight percent of primary amino groups (Jeffamine ® T-403 from the Texaco Co.), 50 parts of a polyoxypropylenediamine having an average molecular weight of 2000 and at least 91 weight percent of primary amino groups and 20 parts of DETDA.

B-Component: analogous to Example 8.

The A and B components were processed in a mixing ratio of A:B=100:46.5, using an index of 105. Both the component and mold temperatures were at 50° C.

The following physical properties were measured on a molded article annealed at 120° C. for one hour:

| Density | DIN 53 420 | [kg/m$^3$]: | 1110 |
|---|---|---|---|
| Tensile Strength | DIN 53 504 | [N/mm$^2$]: | 29 |
| Elongation at Break | DIN 53 504 | [%]: | 180 |
| Tear Propagation Strength | DIN 53 515 | [N/mm] | 109 |
| Hardness | DIN 53 505 | Shore D: | 61 |
| Modulus of Elasticity | DIN 53 457 | [N/mm$^2$]: | 510 |
| Temperature of Deflection Under a Load (HDT) according to ISO-75/B | DIN 53 461 | [°C.]: | 152 |

Example 10

A-Component:

A mixture comprised of:

36.5 parts of a polyoxypropylenediketimine, prepared according to the specifications of Example 3, 17.25 parts of a polyoxypropylenetriamine having an average molecular weight of 5000 and about 70 weight percent of primary amino groups (Jeffamine ® T 5000 from the Texaco Co.), 17.25 parts of a polyoxypropylenediamine having an average molecular weight of 2000 and at least 91 weight percent of primary amino groups (Jeffamine ® D 2000 from the Texaco Co.), 2.0 parts of a polyoxypropylenetriamine having an average molecular weight of 440 and at least 87 weight percent of primary amino groups (Jeffamine ® T-403 from the Texaco Co.) and 27.0 parts of DETDA B-Component A prepolymer containing NCO groups and having an NCO content of 19.2 weight percent, and having a viscosity at 25° C. of 1975 mPas; prepared with stirring by the reaction of 3545 parts of a carbodiimide group-containing 4,4'-diphenylmethane diisocyanate having an NCO content of 29.5 weight percent and 1505 parts of a polyoxypropylenetriol initiated with glycerin having a hydroxyl number of 42; and prepared at a reaction temperature of 80° C.

The A and B components were processed in a mixing ratio of A:B=100:87.0 and at an index of 105 following the general preparation procedure.

The following physical properties were measured on a molded article annealed at 120° C. for one hour:

| Density | DIN 53 420 | [kg/m$^3$]: | 1130 |
|---|---|---|---|
| Tensile Strength | DIN 53 504 | [N/mm$^2$]: | 32 |
| Elongation at Break | DIN 53 504 | [%]: | 180 |
| Tear Propagation Strength | DIN 53 515 | [N/mm]: | 49 |
| Hardness | DIN 53 505 | Shore D: | 60 |
| Modulus of Elasticity | DIN 53 457 | [N/mm$^2$]: | 480 |
| Temperature of Deflection Under a Load (HDT) according to ISO-75/B | DIN 53 461 | [°C.]: | 138 |

Example 11

A-Component:

A mixture composed of:

45.0 parts of a polyoxypropylenediketimine, prepared according to the procedure of Example 3, 10.0 parts of a polyoxypropylenetriamine having an average molecular weight of 5000 and about 70 weight percent of primary amino groups, (Jeffamine ® T-5000 from the Texaco Co.), 17.5 parts of a polyoxypropylenediamine having an average molecular weight of 2000 and at least 91 weight percent of primary amino groups (Jeffamine ® D-2000 from the Texaco Co.), 0.5 parts of a polyoxypropylene-triamine having an average molecular weight of 440 and at least 87 weight percent of primary amino groups (Jeffamine ® T-403 from the Texaco Co.), 22.0 parts of DETDA and 5.0 parts of a mixture composed of 95 weight percent of 3,3', 5,5'-tetraisopropyl-4,4'-diaminodiphenylmethane and 5 weight percent of 3,3'-dimethyl-5,5'-diisopropyl-4,4'-diaminodiphenylmethane.

B-Component: similar to Example 10.

The A and B components were processed in a mixing ratio of A:B=100:78.6 and at an index of 105 following the general preparation procedure.

The following physical properties were measured on a molded article annealed at 120° C. for one hour:

| Density | DIN 53 420 | [kg/m$^3$]: | 1120 |
|---|---|---|---|
| Tensile Strength | DIN 53 504 | [N/mm$^2$]: | 27 |
| Elongation at Break | DIN 53 504 | [%]: | 154 |
| Tear Propagation Strength | DIN 53 515 | [N/mm]: | 58 |
| Hardness | DIN 53 505 | Shore D: | 65 |
| Modulus of Elasticity | DIN 53 457 | [N/mm$^2$]: | 482 |
| Temperature of Deflection Under a Load (HDT) according to ISO-75/B | DIN 53 461 | [°C.]: | 134 |

Example 12

A-Component:

A mixture composed of:

45.0 parts of a polyoxypropylenediketimine, prepared according to the procedure of Example 3, 28.0 parts of a polyoxypropylene-diamine having an average molecular weight of 2000 and at least 91 weight percent of primary amino groups (Jeffamine ® D-2000 from the Texaco Co.), and 27.0 parts of DETDA.

B-Component: analogous to Example 10

The A and B components were processed in a mixing ratio of A:B=100:85.3 and at an index of 105 following the general preparation procedure.

The following physical properties were measured on a molded article annealed at 120° C. for one hour:

| Density | DIN 53 420 | [kg/m$^3$]: | 1120 |
|---|---|---|---|
| Tensile Strength | DIN 53 504 | [N/mm$^2$]: | 34 |
| Elongation at Break | DIN 53 504 | [%]: | 150 |
| Tear Propagation Strength | DIN 53 515 | [N/mm]: | 105 |
| Hardness | DIN 53 505 | Shore D: | 62 |
| Modulus of Elasticity | DIN 53 457 | [N/mm$^2$]: | 491 |
| Temperature of Deflection Under a Load (HDT) according to ISO-75/B | DIN 53 461 | [°C.]: | 148 |

Example 13

A-Component:

A mixture composed of:

44.65 parts of a polyoxypropylenediketimine, prepared according to the procedure of Example 6, 28.35 parts of a polyoxypropylenediamine having an average molecular weight of 2000 and at least 91 weight percent of primary amino groups (Jeffamine ® D-2000 from the Texaco Co.)

27.0 parts of DETDA.

B-Component: analogous to Example 10.

The A and B components were processed in a mixing ratio of A:B=100:85.4 and at an index of 105 following the general preparation procedure.

The following physical properties were measured on a molded article annealed at 120° C. for one hour:

| Density | DIN 53 420 | [kg/m$^3$]: | 1110 |
| Tensile Strength | DIN 53 504 | [N/mm$^2$]: | 33 |
| Elongation at Break | DIN 53 504 | [%]: | 167 |
| Tear Propagation Strength | DIN 53 515 | [N/mm]: | 111 |
| Hardness | DIN 53 505 | Shore D: | 58 |
| Modulus of Elasticity | DIN 53 457 | [N/mm2]: | 470 |
| Temperature of Deflection Under a Load (HDT) according to ISO-75/B | DIN 53 461 | [°C.]: | 141 |

Example 14

A-Component:

A mixture composed of:

43.0 parts of a polyoxypropylenediketimine, prepared according to the procedure of Example 3, 10.0 parts of a polyoxypropylenetriamine having an average molecular weight of 5000 and about 70 weight percent of primary amino groups, (Jeffamine ® T-5000 from the Texaco Co.), 17.5 parts of a polyoxypropylenediamine having an average molecular weight of 2000 and at least 91 weight percent of primary amino groups (Jeffamine ® D-2000 from the Texaco Co.), 0.5 part of a polyoxypropylenetriamine having an average molecular weight of 440 and at least 87 weight percent of primary amino groups (Jeffamine ® T-403 from the Texaco Co.), 22.0 parts of DETDA and 7.0 parts of a mixture composed of 95 weight percent of 3,3′,5,5′-tetraisopropyl-4,4′-diaminodiphenylmethane and 5 weight pecent of 3,3′-dimethyl-5,5′-diisopropyl-4,4′-diaminodiphenylmethane.

B-Component: analogous to Example 10

The A and B components were processed in a mixing ratio of A:B=100:80.7 and at an index of 105 following the general preparation procedure.

The following physical properties were measured on a molded article annealed at 120° C. for one hour:

| Density | DIN 53 420 | [kg/m$^3$]: | 1110 |
| Tensile Strength | DIN 53 504 | [N/mm$^2$]: | 25 |
| Elongation at Break | DIN 53 504 | [%]: | 124 |
| Tear Propagation Strength | DIN 53 515 | [N/mm]: | 80 |
| Hardness | DIN 53 505 | Shore D: | 60 |
| Modulus of Elasticity | DIN 53 457 | [N/mm$^2$]: | 539 |
| Temperature of Deflection Under a Load (HDT) according to ISO-75/B | DIN 53 461 | [°C.]: | 139 |

The following physical properties were measured on a molded article annealed at 200° C. for one hour:

| Density | DIN 53 420 | [kg/m$^3$]: | 1100 |
| Tensile Strength | DIN 53 504 | [N/mm$^2$]: | 29 |
| Elongation at Break | DIN 53 504 | [%]: | 120 |
| Tear Propagation Strength | DIN 53 515 | [N/mm]: | 60 |
| Hardness | DIN 53 505 | Shore D: | 60 |
| Modulus of Elasticity | DIN 53 457 | [N/mm$^2$]: | 561 |
| Temperature of Deflection Under a Load (HDT) according to ISO-75/B | DIN 53 461 | [°C.]: | 200 |

Remarks concerning Examples 8 through 14:

All of the molded articles were bendable to 180° immediately after demolding.

The embodiments of the invention in which an exclusive privilege or property is claimed are defined as follows:

1. An elastomer containing polyamide groups and polyurea groups in bonded form prepared by reacting
   (a) at least one organic polyisocyanate and/or a modified polyisocyanate mixture having an NCO content of from 8 to 33.6 weight percent, based on the weight of the polyisocyanate mixture,
   (b) at least one polyazomethine and
   (c) at least one alkyl-substituted aromatic polyamine having a molecular weight up to 500, and optionally in the presence of
   (d) catalysts, wherein the reaction product of a polyoxyalkylenepolyamine, having a functionality of from 2 to 4 and an average molecular weight of from 180 to 10,000 and at least one organic aldehyde and/or ketone, are used as the polyazomethine (b).

2. The elastomer of claim 1 wherein said elastomer has:
   a density according to DIN 53 420 of from 800 kg/m$^3$ to 1400 kg/m$^3$
   a tensile strength according to DIN 53 404 of from 15 N/mm$^2$ to 45
   an elongation at break according to DIN 53 504 of from 40 percent to 400 percent,
   a tear propagation strength according to DIN 53 515 of from 35N/mm to 140N/mm,
   a Shore D hardness according to DIN 53 505 of from 40 to 80,
   a Modulus of elasticity according to DIN 53 547 of from 300N/mm$^2$ to 1800N/mm$^2$
   a temperature of deflection under a load according to ISO-75/B (DIN 53 461) of from 80° C. to 205° C.

3. The elastomer of claim 1 wherein said polyazomethine (b) is prepared by the reaction of a polyoxyalkylenepolyamine having a functionality of from 2 to 4 and an average molecular weight of from 180 to 10,000, and an aliphatic and/or cycloaliphatic ketones.

4. The elastomer of claim 1 wherein mixtures of polyoxyalkylenepolyamines and polyketimines are used as polyazomethines (b) in such quantities that they contain from 10 percent to 90 percent of primary amino groups of polyoxyalkylenepolyamines having a functionality of from 2 to 4 and an average molecular weight of from 180 to 10,000 and from 90 to 10 percent of ketimine groups of polyketimines, prepared by the reaction of the polyoxyalkylenepolyamines with at least one aliphatic and/or cycloaliphatic ketone, wherein the percents are based on the total of both the amino and ketimine groups.

5. The elastomer of claim 1 wherein the modified polyisocyanate mixtures (a) having NCO contents of from 8 weight percent to 33.6 weight percent are selected from the group consisting of:
- carbodiimide and/or urethane group-containing polyisocyanates of 4,4'-diphenylmethanediisocyanate, a carbodiimide and/or urethane group containing mixture of 4,4'- and 2,4'-diphenylmethanediisocyanates,
- a prepolymer, containing NCO groups, prepared through the reaction of polyoxyalkylenepolyols haing a functionality of from 2 to 4 and a molecular weight of from 600 to 6000, with 4,4'-diphenylmethanediisocyanate or a mixture composed of 4,4'- and 2,4'-diphenylmethanediisocyanates.

6. A process for the preparation of an elastomer consisting of reacting
  (a) an organic polyisocyanate and/or a modified polyisocyanate mixture having an NCO content of from 8 to 33.6 weight percent, based on the weight of the polyisocyanate mixture, with
  (b) at least one polyazomethine and
  (c) at least one aromatic diamine, which has in bonded form at least one alkyl substituent in the ortho position relative to each amino group, having a molecular weight up to 500,
optionally in the presence of
  (d) a catalyst
in open or closed molds wherein the reaction product of a polyoxyalkylenepolyamine, having a functionality of from 2 to 4 and having an average molecular weight of from 180 to 10,000, and at least one organic aldehyde and/or preferably a ketone are used as polyazomethines (b).

7. The process of claim 6 wherein the molded articles are prepared using RIM technology in closed molds.

8. The process of claim 6 wherein the reaction is carried out in the presence of
  (e) a blowing agent
and under compression in a closed mold.

9. The process of claim 6 wherein a polyketimine, prepared by the reaction of a polyoxyalkalenepolyamine having a functionality of from 2 to 4 and an average molecular weight of from 180 to 10,000, with an aliphatic cycloaliphatic ketone is used as the polyazomethine (b).

10. The process of claim 7 wherein the reaction is carried out in the presence of
  (e) a blowing agent
and under compression in a closed mold.

11. The process of claim 6 wherein mixtures of polyoxyalkalenepolyamines and polyketimines are used as polyazomethines (b) in such quantities that they are composed of from 10 to 90 percent of primary amino groups of polyoxyalkylenepolyamines having a functionality of from 2 to 4 and an average molecular weight of from 180 to 10,000 and from 90 to 10 percent of ketimine groups of polyketimines, prepared by the reaction of said polyoxyalkylenepolyamines with at least one aliphatic and/or cycloaliphatic ketone, wherein the percents are based on the total of both the amino and ketimine groups.

12. The process of claim 6 wherein the aromatic diamine is selected from the group consisting of 1,3,5-triethyl-2,4-phenylenediamine, 1-methyl-3, 5-diethyl-2,4-phenylendiamine and/or 1-methyl-3,5-diethyl-2,6-phenylenediamine, 3,3'-dialkyl-4,4'-diaminodiphenylmethane having from 1 to 4 carbon atoms in the alkyl radical and/or 3,3', 5,5'-tetraalkyl-4,4'-diaminodiphenylmethane having from 1 to 4 carbon atoms in the alkyl radical.

13. The process of claim 6 wherein the aromatic diamine is selected from the group consisting of 1,3,5-triethyl-2,4-phenylenediamine, 1-methyl-3, 5-diethyl-2,4-phenylendiamine and/or 1-methyl-3,5-diethyl-2,6-phenyenediamine, 3,3'-dialkyl-4,4'-diaminodiphenylmethane having from 1 to 4 carbon atoms in the alkyl radical and/or 3,3', 5,5'-tetraalkyl- 4,4'-diaminodiphenylmethane having from 1 to 4 carbon atoms in the alkyl radical.

14. The process of claim 7 wherein the aromatic diamine is selected from the group consisting of 1,3,5-triethyl-2,4-phenylenediamine, 1-methyl-3, 5-diethyl-2,4-phenylendiamine and/or 1-methyl-3,5-diethyl-2,6-phenylenediamine, 3,3'-dialkyl-4,4'-diaminodiphenylmethane having from 1 to 4 carbon atoms in the alkyl radical and/or 3,3', 5,5'-tetraalkyl-4,4'-diaminodiphenylmethane having from 1 to 4 carbon atom in the alkyl radical.

15. The process of claim 8 wherein the aromatic diamine is selected from the group consisting of 1,3,5-triethyl-2,4-phenylenediamine, 1-methyl-3, 5-diethyl-2,4-phenylendiamine and/or 1-methyl-3,5-diethyl-2,6-phenylenediamine, 3,3'-dialkyl-4,4'-diaminodiphenylmethane having from 1 to 4 carbon atoms in the alkyl radical and/or 3,3', 5,5'-tetraalkyl-4,4'-diaminodiphenylmethane having from 1 to 4 carbon atoms in the alkyl radical.

16. The process of claim 6 wherein the starting components (b) and (c) are used in such quantities that the ratio of ketimine groups or ketimine groups and amino groups of starting component (b) is from 95 to 60 to 5 to 40 to the amino groups of the starting component (c).

17. The process of claim 7 wherein the starting components (b) and (c) are used in such quantities so that the ratio of ketimine groups or ketimine groups and amino groups of starting component (b) is from 95 to 60 to 5 to 40 to the amino groups of the starting component (c).

18. The process of claim 8 wherein the starting components (b) and (c) are used in such quantities so that the ratio of ketimine grouss or ketimine groups and amino groups of starting component (b) is from 95 to 60 to 5 to 40 to the amino groups of the starting component (c).

19. The process of claim 6 wherein the modified polyisocyanate mixtures (a) having NCO contents of from 8 to 33.6 weight percent are selected from the group consisting of:
- carbodiimide and/or urethane group-containing polyisocyanates from 4,4'-diphenylmethanediisocyanate or a mixture of 4,4'- and 2,4'-diphenylmethane-diisocyanates having an NCO content of from 8 to 33.6 weight percent,
- a prepolymer, containing NCO groups, prepared by reacting a polyoxyalkylenepolyol having a functionality of from 2 to 4 and a molecular weight of from 600 to 6000, with 4,4'-diphenylmethanediisocyanate or a mixture composed of 4,4' and 2,4'-diphenylmethanediisocyanates.

20. The process of claim 7 wherein the modified polyisocyanate mixtures (a) having NCO contents of from 8 to 33.6 weight percent are selected from the group consisting of:
- carbodiimide and/or urethane group-containing polyisocyanates from 4,4'-diphenylmethanediisocyanate or a mixture of 4,4'- and 2,4'-diphenylmethanediisocyanates having an NCO content of from 8 to 33.6 weight percent, a prepolymer, containing NCO groups, prepared by reacting a polyoxyalkylene-polyol having a functionality of from 2 to 4 and a molecular weight of from 600 to 6000, with 4,4'-diphenylmethanediisocyanate or a mixture composed of 4,4' and 2,4'-diphenylmethanediisocyanates.

21. The process of claim 8 wherein the modified polyisocyanate mixtures (a) having NCO contents of from 8 to 33.6 weight percent are selected from the group consisting of:

carbodiimide and/or urethane group-containing polyisocyanates from 4,4'-diphenylmethanediisocyanate or a mixture of 4,4'- and 2,4'-diphenylmethanediisocyanates having an NCO content of from 8 to 33.6 weight percent, a prepolymer, containing NCO groups, prepared by reacting a polyoxyalkylenepolyol having a functionality of from 2 to 4 and a molecular weight of from 600 to 6000, with 4,4'-diphenylmethanediisocyanate or a mixture composed of 4,4' and 2,4'-diphenylmethanediisocyanates.

22. A polyketimine comprising reacting polyoxyalkylenepolyamine having a functionality of from 2 to 4 and a molecular weight of from 180 to 10,000, selected from the group consisting of polyoxyethylenepolyamine, polyoxypropylenepolyamine, polyoxytetramethylenepolyamine, polyoxypropylenepolyoxyethylenepolyamine, polyoxytetramethylenepolyoxypropylenepolyamine and/or polyoxytetramethylenepolyoxyethylenepolyamine, with an aliphatic and/or cycloaliphatic ketone selected from the group consisting of methylisobutylketone, methylcyclohexanone, cyclohexanone and cyclopentanone.

* * * * *